No. 12,480. REISSUED MAY 8, 1906.

W. C. TREGONING.

PUSH BUTTON ELECTRIC SWITCH.

APPLICATION FILED APR. 16, 1906.

Witnesses.

C. F. Storrs

Ethel M. Cowe.

Inventor.

William C. Tregoning per Harry P. Williams

Attorney.

UNITED STATES PATENT OFFICE

WILLIAM C. TREGONING, OF HACKENSACK, NEW JERSEY, ASSIGNOR, BY MESNE ASSIGNMENTS, TO THE PERKINS CORPORATION, OF HARTFORD, CONNECTICUT, A CORPORATION OF CONNECTICUT.

PUSH-BUTTON ELECTRIC SWITCH.

No. 12,480. Specification of Reissued Letters Patent. Reissued May 8, 1906.

Original No. 741,853, dated October 20, 1903. Application for reissue filed April 16, 1906. Serial No. 312,040.

*To all whom it may concern:*

Be it known that I, WILLIAM C. TREGONING, a citizen of the United States, formerly residing at Hartford, Connecticut, but now residing at Hackensack, New Jersey, have invented certain new and useful Improvements in Push-Button Electric Switches, of which the following is a specification.

This invention relates to an electric switch which has poles that are oscillated by a spring which is made tense by the reciprocation of push-buttons.

The object of this invention is to provide a simple, safe, and durable switch mechanism which will operate easily, smoothly, and quickly.

The oscillating poles of this switch are borne on the ends of a spindle on which is an escape-plate to which the poles are connected and a cam-plate to which the push-buttons are connected. Each of these plates has an arm that extends between the ends of the throwing-spring which is coiled about the spindle. The cam-plate has a cam-slot into which a stud projects from a slide that is movable on the frame-plate and that has a lug which normally stands in the path of an arm that projects from the escape-plate. The inward movement of the outer push-button oscillates the cam-plate and places the spring under tension, and at the same time the cam-slot and stud move the slide until the spring has the desired tension, at which time the lug is carried out of the path of the escape-arm, so that the spring can throw the escape-plate and the poles.

Figure 1:
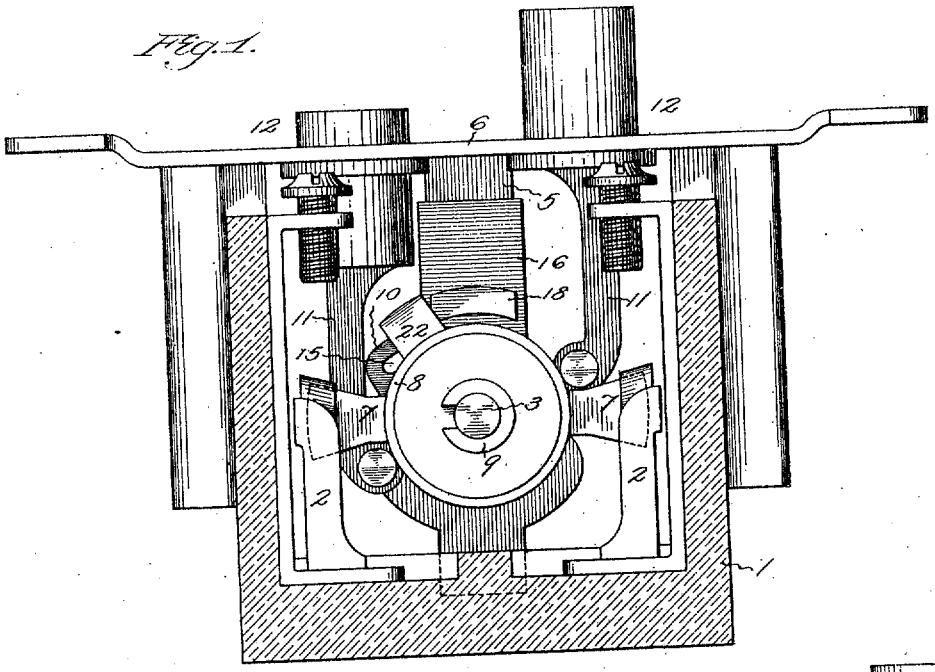
Figure 2:
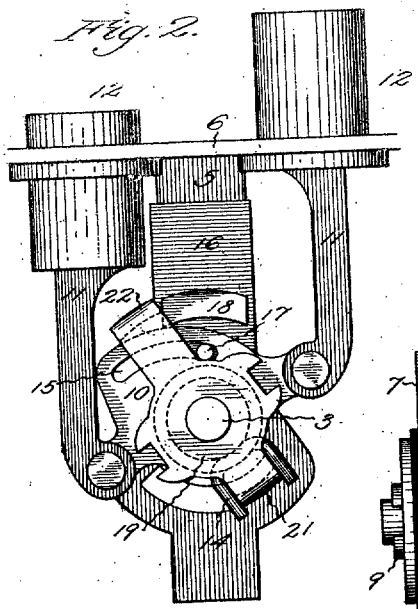
Figure 4:
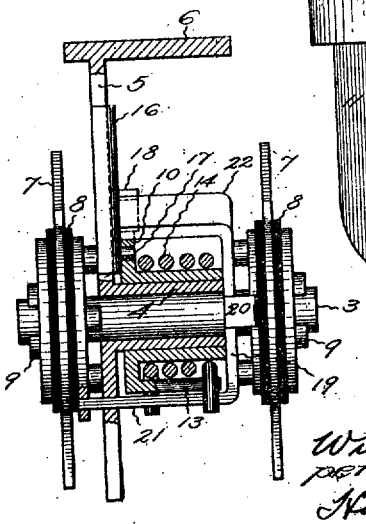
Figure 3:
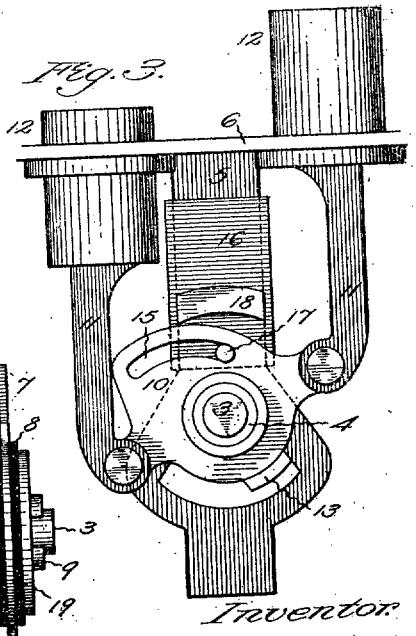

Figure 1 of the accompanying drawings shows a side view of one of these switches with a wall of the receptacle cut away to expose the mechanism, the parts being in the positions occupied when the poles are engaged with the contacts and the circuit is closed. Fig. 2 shows a side view of the mechanisms in the same positions with the poles omitted. Fig. 3 shows a side view of the mechanisms with the poles, the escape-plate, and throwing-spring removed. Fig. 4 shows a transverse section taken through the frame-plate on the plane of the spindle, showing the manner of supporting the poles on the spindle and connecting them with each other and also with the escape-plate.

The receptacle 1 of this switch may be made of porcelain or any other suitable material in any desired shape. The contacts 2 are mounted in the receptacle in the usual way and provided with ordinary means for the attachment of the circuit-wires. The spindle 3 is loosely held by the hub 4, that projects from the frame-plate 5, which is attached to the supporting-plate 6, that is fastened in any suitable manner across the open end of the receptacle. The poles 7, that are properly insulated by the washers 8, are mounted on the ends of the spindle and are held in place by the split washers 9. The cam-plate 10 is loosely mounted on the hub 4, and to the opposite sides of this plate the fingers 11 of the push-buttons 12 are jointed. The cam-plate has an arm 13, that extends between the ends of the spring 14, that is coiled about the hub of the cam-plate. In the cam-plate is a cam-slot 15, and projecting into this slot from a slide 16, that is movable on the frame-plate, is a stud 17. When the cam-plate is oscillated, this cam-slot and stud reciprocate the slide on the frame-plate. The lug 18 is fixed to the slide. The escape-plate 19 is loosely mounted on the spindle. This plate is connected with one pole by the lug 20 and with the other pole by the arm 21, that also passes between the ends of the spring. The escape-plate has an arm 22, that projects toward the slide and normally lies against one edge of the stop-lug 18. When the outer push-button is thrust inwardly, the cam-plate is oscillated, and its arm engages one end of the spring and puts it under tension as long as the escape-arm is in engagement with the stop-lug, and the other end of the spring is held by the spring-arm of the escape-plate. As the cam-plate is oscillated the cam-slot and stud move the slide along the frame-plate and carry the stop-lug out of the path of the escape-arm. The cam-slot is so shaped that the stop-lug is not moved out of the path of the escape-arm until the spring has been given sufficient tension to properly throw the poles. When the stop-lug has been moved out of the path of the escape-arm, the escape-plate is free to be thrown by the spring, and of course this movement of the escape-plate carries the poles. The cam-slot is so cut that the inward movement of one push-button causes the slide and the stop-lug to move inwardly.

and the inward movement of the other push-button causes the slide and the stop-lug to move outwardly. The tension of the spring is determined by the time that the stop-lug holds the escape-arm, and the movement of the stop-lug is governed by the pitch of the cam-slot.

The parts of this switch are simple to make and easy to assemble. The stop-lug holds the escape-arm positively until the slide has been moved the necessary distance to release the escape-arm. The slide moves freely on the frame-plate, and there is but little friction between the edges of the stop-lug and the edges of the escape-arm. The stop-lug is broad and strong, so that it will surely hold the escape-arm and will not wear out or become loose or break.

I claim as my invention—

An electric switch having a frame-plate, a spindle supported by the frame-plate, oscillatory poles mounted on the spindle, an escape-plate mounted on the spindle and connected with the poles and having an escape-arm and a spring-arm, a cam-plate mounted concentric of the spindle and having a cam-slot and a spring-arm, a slide movable upon the frame-plate and having a stud extending into the cam-slot and a lug extending into the path of the escape-arm, a spring coiled about the spindle and having its ends extending on opposite sides of the spring-arms projecting from the cam-plate and the escape-plate, and push-buttons connected with the cam-plate, substantially as specified.

WILLIAM C. TREGONING.

Witnesses:
H. R. WILLIAMS,
ETHEL M. LOWE.